(12) United States Patent
Rogers

(10) Patent No.: US 8,972,975 B1
(45) Date of Patent: Mar. 3, 2015

(54) BOUNDED INSTALLATION TIME OPTIMIZATION OF APPLICATIONS

(71) Applicant: Google Inc., Mountain View, CA (US)

(72) Inventor: Ian Andrew Rogers, Mountain View, CA (US)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 13/854,207

(22) Filed: Apr. 1, 2013

(51) Int. Cl.
*G06F 9/445* (2006.01)
*G06F 9/45* (2006.01)

(52) U.S. Cl.
CPC ............... *G06F 8/61* (2013.01); *G06F 8/4441* (2013.01)
USPC ............................ 717/175; 717/154; 717/176

(58) Field of Classification Search
CPC ........... G06F 8/41; G06F 9/44; G06F 8/4441; G06F 8/61
USPC .......... 717/139, 146–148, 151–154, 175–178
See application file for complete search history.

(56) References Cited

U.S. PATENT DOCUMENTS

| | | | |
|---|---|---|---|
| 6,412,107 B1 * | 6/2002 | Cyran et al. | ............ 717/148 |
| 6,978,450 B2 | 12/2005 | Burch | |
| 7,174,544 B2 | 2/2007 | Zee | |
| 7,853,933 B2 * | 12/2010 | Coker et al. | ............ 717/136 |
| 8,584,104 B2 * | 11/2013 | Gibbons et al. | ............ 717/140 |
| 2003/0005425 A1 | 1/2003 | Zee | |
| 2011/0246974 A1 | 10/2011 | Kawachiya et al. | |

FOREIGN PATENT DOCUMENTS

EP 0943990 A2 9/1999

* cited by examiner

*Primary Examiner* — Ted T Vo
(74) *Attorney, Agent, or Firm* — McDonnell Boehnen Hulbert & Berghoff LLP

(57) ABSTRACT

A disclosed method may include, in a computing device including at least one processor, a memory, and an operating system with a plurality of modes of execution, accessing instructions received by the computing device for installation and optimization use at least one of the plurality of modes of execution. The instructions may include a plurality of subroutines. A fingerprint for each of the subroutines may be generated. Each fingerprint may be associated with a number of instructions in a corresponding subroutine. The subroutine may also include determining, for each of the plurality of subroutines and based on the fingerprint, performance score and estimated compilation time associated with each of the plurality of modes of execution, for compiling the corresponding subroutine. One of the plurality of modes of execution may be selected based on maximizing a total performance score for the plurality of subroutines, and limiting total compilation and installation time.

20 Claims, 6 Drawing Sheets

BOUNDED INSTALLATION TIME OPTIMIZATION OF APPLICATIONS

BACKGROUND

Optimization of downloaded applications within computing devices may be a challenging task due to the availability of many modes of execution, which may be chosen amongst at the time of application installation.

Further limitations and disadvantages of conventional and traditional approaches will become apparent to one of skill in the art, through comparison of such approaches with some aspects of the present method and apparatus set forth in the remainder of this disclosure with reference to the drawings.

SUMMARY

A system and/or method is provided for bounded installation time optimization of applications, substantially as shown in and/or described in connection with at least one of the figures, as set forth more completely in the claims.

In accordance with an example embodiment of the disclosure, a method may include, in a computing device including at least one processor, a memory, and an operating system with a plurality of modes of execution, accessing instructions received by the computing device. The instructions may be divided into a plurality of subroutines (also known as functions or methods). A fingerprint for each of the plurality of subroutines may be generated. Each fingerprint may identify a plurality of performance scores associated with the plurality of modes of execution of the subroutine on the computing device. The performance scores may be calibrated to the computing device. One of the plurality of modes of execution may be selected for each of the plurality of subroutines, based on maximizing a total performance score for the plurality of subroutines, and limiting a total installation time of the plurality of subroutines to remain within a determined period of time.

These and other advantages, aspects and features of the present disclosure, as well as details of illustrated implementation(s) thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The present disclosure relates to a method and system for bounded install time optimization of applications (or apps). Client devices (e.g., smart phones, tablets or other computing devices) may download applications from an application marketplace (e.g., online app store implemented using a provisioning server). After an application is downloaded, an installation process may take place, which may include compiling (or further optimizing) the application code.

In some instances, the downloaded app may include an intermediate file format, and the installation may include ahead-of-time (AOT) compilation. In accordance with an example embodiment of the disclosure, the AOT compilation may utilize at least one of a plurality of modes of execution for each subroutine (also known as function or method) within the app's instructions. Additionally, each mode of execution may be selected (e.g., based on the complexity of each subroutine, number of instructions in the subroutine, the use of floating point operations, number of loops within the subroutine, etc.) so that the total app optimization time is bounded so it does not exceed a predetermined allotted time period. In instances when there is an increase in the optimization level (e.g., a higher optimization level is selected for a given subroutine), other subroutines may be placed inline in the original subroutine to increase the performance of the code.

Figure 1:
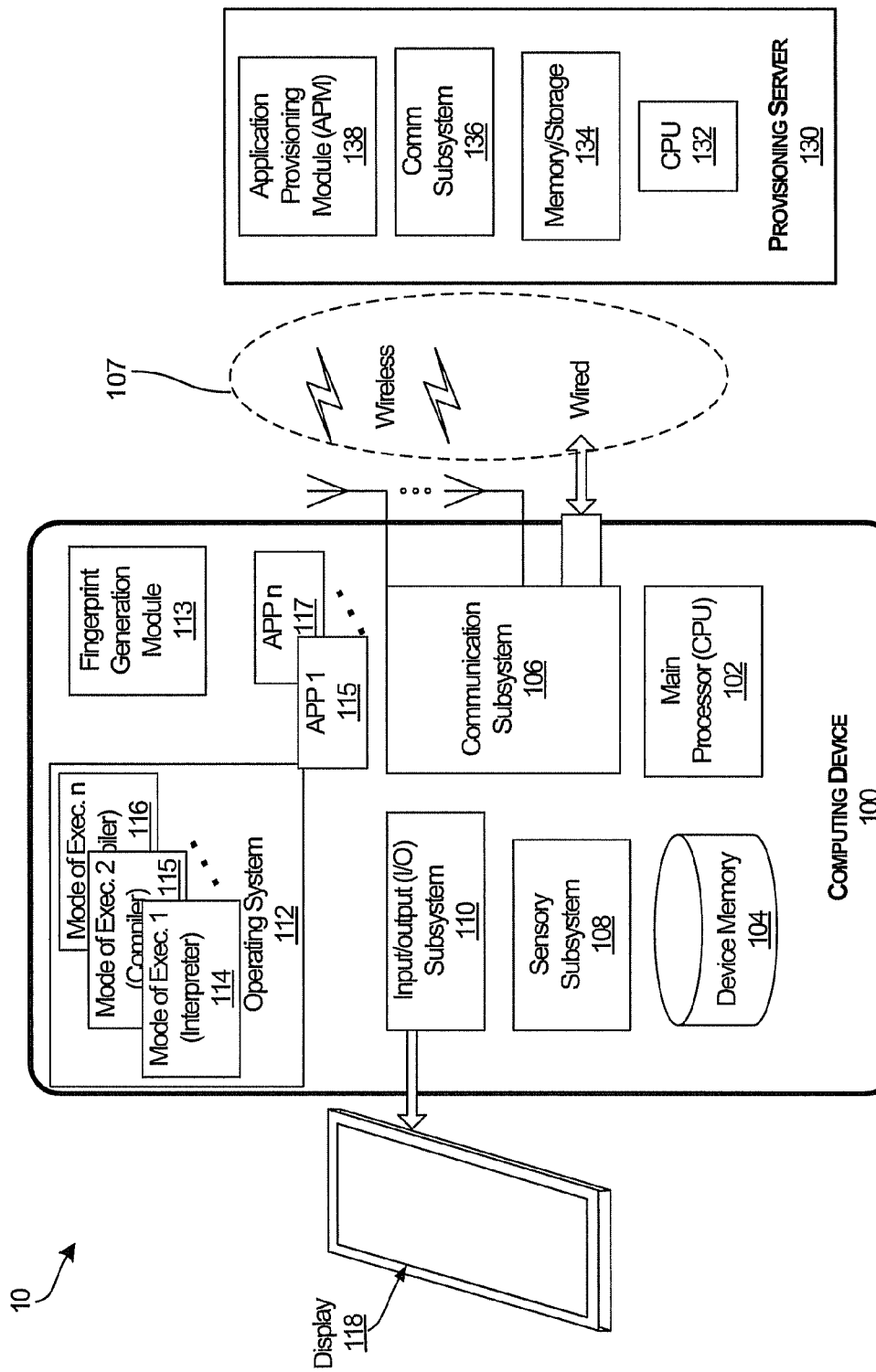
FIG. 1 is a block diagram illustrating an example architecture including a computing device with differing modes of execution communicating with a provisioning server, in accordance with an example embodiment of the disclosure.

FIG. 1 is a block diagram illustrating an example architecture including a computing device with differing modes of execution communicating with a provisioning server, in accordance with an example embodiment of the disclosure. Referring to FIG. 1, the example architecture 10 may comprise a computing device 100 and a provisioning server 130.

The computing device 100 may comprise suitable logic, circuitry, interfaces, and/or code that may be operable to implement various aspects of the architecture 10 for limiting installation time of apps. The computing device 100 may comprise a handset, a smartphone, a tablet, a laptop, and/or another handheld or portable computing device. The computing device 100 may comprise, for example, a main processor (or CPU) 102, a system memory 104, a communication subsystem 106, a sensory subsystem 108, an input/output (I/O) subsystem 110, and a display 118. The computing device 100 may also comprise an operating system 112, one or more applications 115, . . . , 117 running on the computing device 100, and a fingerprint generation module 113.

The main processor 102 may comprise suitable logic, circuitry, interfaces, and/or code that may be operable to process data, and/or control and/or manage operations of the computing device 100, and/or tasks and/or applications performed therein in connection with limiting of installation time of apps (e.g., 115, . . . , 117) by the computing device 100. In this regard, the main processor 102 may be operable to configure and/or control operations of various components and/or subsystems of the computing device 100, by utilizing, for example, one or more control signals. The main processor 102 enables running and/or execution of applications, programs and/or code (e.g., one or more of the modes of execution 114, . . . , 116 within the operating system 112/or one or more of the applications 115, . . . , 117), which may be stored, for example, in the system memory 104. Alternatively, one or more dedicated application processors may be utilized for running and/or executing applications (or programs) in the computing device 100.

The modes of execution 114, . . . , 116 may comprise, for example, a first mode of execution (e.g., an interpreter 114) and a plurality of other modes of execution (e.g., compilers 115, . . . , 116).

In some instances, one or more of the applications 115, . . . , 117 running and/or executing on the computing device 100 may generate and/or update video content that may be rendered via the display 120.

The system memory 104 may comprise suitable logic, circuitry, interfaces, and/or code that may enable permanent and/or non-permanent storage, buffering, and/or fetching of data, code and/or other information, which may be used, consumed, and/or processed. In this regard, the system memory 104 may comprise different memory technologies, including, for example, read-only memory (ROM), random access memory (RAM), Flash memory, solid-state drive (SSD), and/or field- programmable gate array (FPGA). The system memory 104 may store, for example, configuration data, which may comprise parameters and/or code, comprising software and/or firmware (e.g., the operating system 112, the modes of execution 114, . . . , 116, and/or one or more of the applications 115, . . . , 117).

The communication subsystem 106 may comprise suitable logic, circuitry, interfaces, and/or code operable to communicate data from and/or to the computing device, such as via one or more wired and/or wireless connections 107. The communication subsystem 106 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/ interface), facilitating transmission and/or reception of signals to and/or from the computing device 100, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 106 may provide wired and/or wireless connections to, for example, the provisioning server 130 via the wired and/or wireless connections 107.

The sensory subsystem 108 may comprise suitable logic, circuitry, interfaces, and/or code for obtaining and/or generating sensory information, which may relate to the computing device 100, its user(s), and/or its environment. For example, the sensory subsystem 108 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 110 may comprise suitable logic, circuitry, interfaces, and/or code for enabling user interactions with the computing device 100, enabling obtaining input from user(s) and/or to providing output to the user(s). The I/O subsystem 110 may support various types of inputs and/or outputs, including, for example, video, audio, and/or textual. In this regard, dedicated I/O devices and/or components, external to or integrated within the computing device 100, may be utilized for inputting and/or outputting data during operations of the I/O subsystem 110. Exemplary I/O devices may comprise displays, mice, keyboards, touchscreens, voice input interfaces, and other input/output interfaces or devices. With respect to video outputs, the I/O subsystem 110 may be operable to generate and/or process video content, graphics, and/or textual data, and/or generate video frames based thereon for display, via the display 118 for example.

The display 118 may comprise suitable logic, circuitry, interfaces and/or code that may enable displaying of video content, which may be handled and/or processed via the I/O subsystem 110. The display 120 may be used in outputting video data.

The operating system 112 may include software that is used to manage the various hardware resources of the computing device 100. The operating system 112 may also be used to provide common services to computer programs or applications, such as the one or more applications 115, . . . , 117. The operating system 112 tends to act as an intermediary between the hardware components and the one or more applications 115, . . . , 117.

The operating system 112 may also comprise a plurality of modes of execution 114, . . . , 116, which may be selected and use to optimize one or more applications (e.g., 115, . . . , 117) after they have been downloaded from, e.g., the provisioning server 130. The modes of execution 114, . . . , 116 may be different from each other, utilizing a different level of code optimization; for example, use of an interpreter or compilation with an "optimization level" such as O0, O1, or O2 where the number implies increased compilation effort and therefore time that may result in increased runtime performance of the optimized instructions. The installation time required by each of the modes of execution 114, . . . , 116 may vary based on resources of the computing device 100 (e.g., number and type of processing cores, available memory, etc.).

Even though only three modes of execution are mentioned herein, the present disclosure may not be limited in this regard, and other types of modes of execution (with varying degree of code optimization and corresponding installation completion times) may also be used by the computing device 100. Additionally, even though the modes of execution are disclosed (e.g., FIG. 1) as implemented within the operating system 112, the present disclosure may not be limited in this regard, and the modes of execution 114, . . . , 116 may be implemented separately from the operating system 112.

The one or more applications 115, . . . , 117 may include one or more software applications (i.e., computer programs) that help the user perform a specific task. For example, a software application may include an interactive application that displays content to a user and allows the user to provide input as to the manner in which the content is provided and/or the type of content that is provided. To perform a task (e.g., web browsing, video playback, etc.), the one or more applications 116, . . . , 118 may access the CPU 102, the memory 104, and/or any other circuit within the computing device 100, as well as the operating system 112.

The fingerprint generation module 113 may comprise suitable circuitry, logic and/or code and may be operable to generate a fingerprint of one or more subroutines within instructions that will be compiled for one or more of the modes of execution 114, ..., 116. Further detailed description of the fingerprint generation module 113 is provided herein below in reference to FIG. 3B.

The provisioning server 130 may comprise suitable circuitry, logic and/or code and may be operable to provide one or more functionalities to the computing device 100 (and/or other similar devices in a device ecosystem), including provisioning of applications and/or media items (e.g., via an e-marketplace), application and software updates, and/or software and device security functionalities relating to administration and operation of the operating system 112. The provisioning server 130 may comprise a CPU 132, a memory 134, and a communication subsystem 136, which may be similar in functionalities to the CPU 102, the memory 104 and the communication subsystem 106, respectively, in the computing device 100. The provisioning server 130 may also comprise an application provisioning module (APM) 138.

The APM 138 may comprise suitable circuitry, logic and/or code and may be operable to provide one or more applications (e.g., apps 115, ..., 117) for download by the computing device 100. For example, the APM 138 may implement an e-commerce marketplace for sale/download of media items (e.g., movies, books, music, TV shows, etc) as well as applications. Additionally, some of the applications that are provided by the APM 138 may comprise compiled binary code so that no further compilation may be required by the computing device 100 after download. Other applications provided by the APM 138 may be in an intermediary file format and may require compilation (e.g., ahead-of-time, or AOT, compilation at the application installation time) by the computing device 100 after download.

In operation, the computing device 100 may be utilized (e.g., by a user) to perform, execute, or run various tasks and/or applications (e.g., at least one of the one or more applications 115, ..., 117). Additionally, prior to execution, the computing device 100 may download instructions of one or more of the apps 115, ..., 117, and may use the one or more modes of execution 114, ..., 116 to either interpret or perform AOT compilation at the time of app installation.

For example, one or more of the apps 115, ..., 117 may comprise instructions associated with an intermediary file format. The instructions may comprise code implementing a plurality of subroutines. After an app is downloaded from the provisioning server 130, the fingerprint generation module 113 may generate a fingerprint for every subroutine within the downloaded app. For every subroutine and for each mode of execution choice (e.g., for the interpter or for each mode of execution 114, ..., 116), a performance score for the quality of the compiled code (e.g., lower quality if an interpreter will be used, higher quality if the best compiler will be used, such as a mode of execution with O2 optimization level) and an expected compilation time may be generated based on the fingerprint. The expected compilation time may factor in information from the computing device 100, such as number of CPU cores and remaining battery).

Initially, the best quality mode of execution (e.g., a compiler with O2 optimization level) may be set for each subroutine within the app. If the total compilation time fits within an allotted time budget, then compilation may proceed with the subroutine(s) with the slowest compilation time (after compiling, the compiled subroutine(s) may be removed from the list of subroutines associated with the instructions). The compilation time of the subroutine(s) may be compared with the expected compilation time, and if it is faster or slower than a margin of tolerance, performance score and expected compilation time may be recomputed for all remaining subroutines.

If the total compilation time is greater than the allotted time budget, the subroutine with the highest compilation time-to-performance score ratio may be determined, and the mode of execution selection may be lowered for that subroutine. Processing may then resume by computing whether the total compilation time fits within an allotted time budget. In this regard, the compilation/installation time of apps may be bound to an allotted time period.

Figure 2:
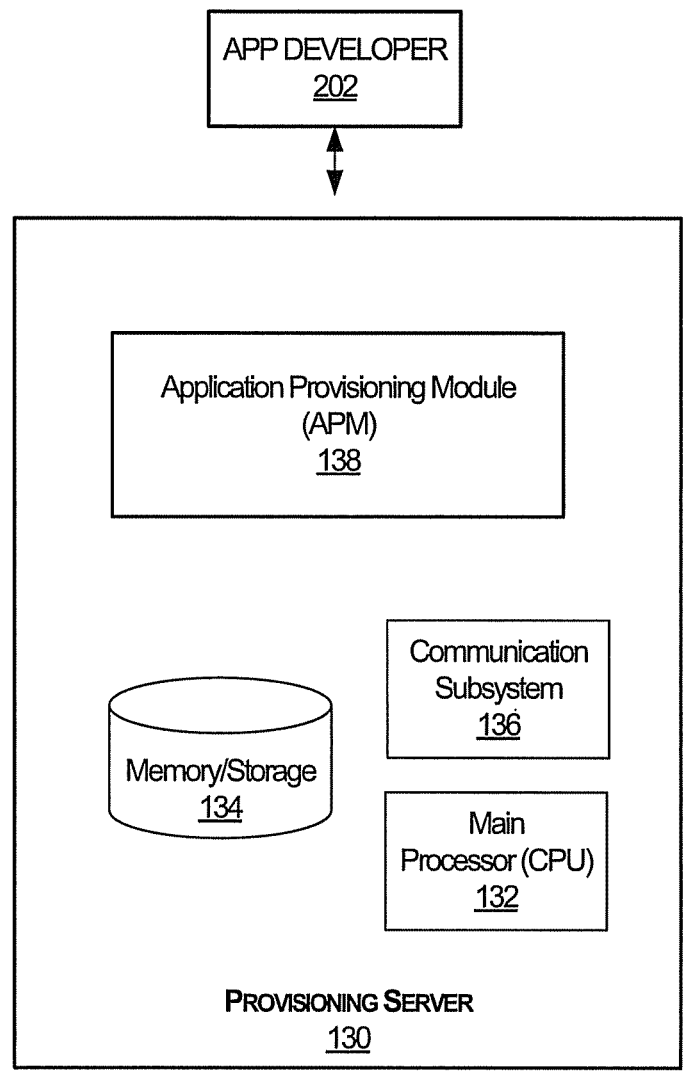
FIG. 2 is a block diagram illustrating an example provisioning server, in accordance with an example embodiment of the disclosure.

FIG. 2 is a block diagram illustrating an example provisioning server, in accordance with an example embodiment of the disclosure. Referring to FIG. 2, the provisioning server 130 may comprise suitable circuitry, logic and/or code and may be operable to provide one or more functionalities to the computing device 100 (and/or other similar devices in a device ecosystem), including provisioning of applications and/or media items (e.g., via an e-marketplace), application and software updates, and/or software and device security functionalities relating to administration and operation of the operating system 112. The provisioning server 130 may comprise a CPU 132, a memory 134, and a communication subsystem 136, which may be similar in functionalities to the CPU 102, the memory 104 and the communication subsystem 106, respectively, in the computing device 100. The provisioning server 130 may also comprise an application provisioning module (APM) 138.

The APM 138 may comprise suitable circuitry, logic and/or code and may be operable to provide one or more applications (e.g., apps 115, ..., 117) for download by the computing device 100.

Figure 3A:
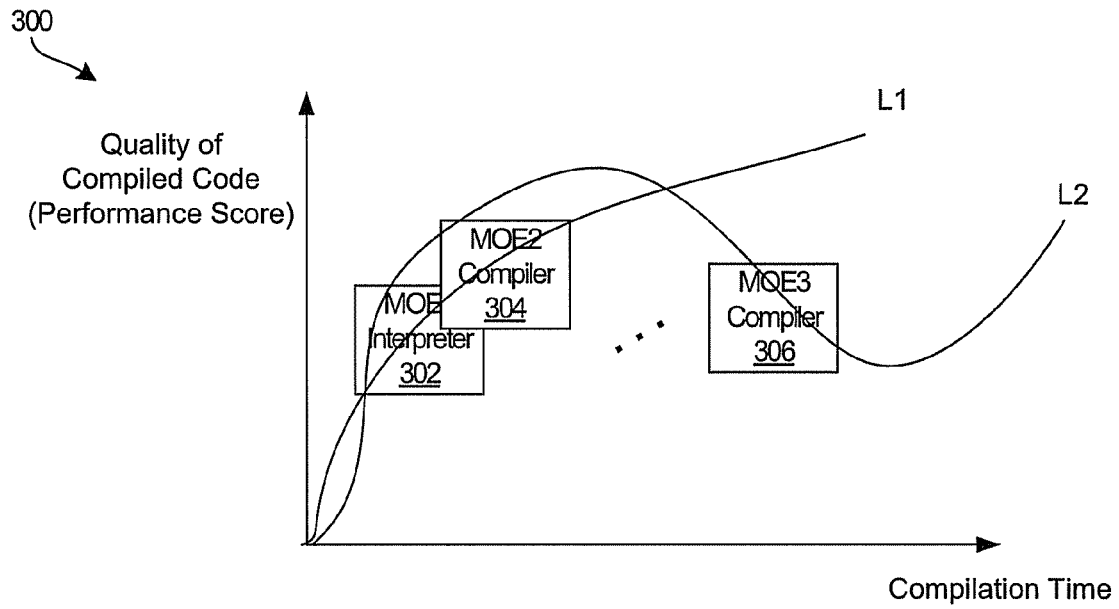
FIG. 3A illustrates a graph of various types of modes of execution, which may be used by the computing device of FIG. 1, in accordance with an example embodiment of the disclosure.

FIG. 3A illustrates a graph of various types of modes of execution, which may be used by the computing device of FIG. 1, in accordance with an example embodiment of the disclosure. Referring to FIG. 3A, there is illustrated a graph 300 of a plurality of modes of execution (or MOE) 302, ..., 306, which may be of different type 1, ..., N, respectively (e.g., MOE1 may be an interpreter 302, MOE2 may be a compiler 304, etc.). Additionally, graph 300 illustrates example fingerprint curves L1 and L2, where for a given fingerprint value, there may be more than one modes of execution that can be used during installation (e.g., MOE1 and MOE2 overlap for given values along the fingerprint curves L1 and L2). As seen in FIG. 3A, in some instances additional compilation time may provide better performance score (e.g., change from MOE1 to MOE2), and in some instances, additional compilation time may decrease the performance score (e.g., change from MOE2 to MOE3).

Each of the modes of execution 302, ..., 306 may utilize a different level of code optimization during compilation. For example, mode of execution 302 may be an interpreter, while one or more of modes of execution 304, ..., 306 may comprise an interpreter or compilers with an "optimization level" such as O0, O1, or O2, as explained herein above. As seen in graph 300, as the quality of the compiled code increases (e.g., using mode of execution with increasing optimization level), the corresponding time for compilation may also increase. The compilation time may also depend on hardware characteristics of the compiling device (e.g., number of CPU cores, free memory, operating system specifics, etc.).

Figure 3B:
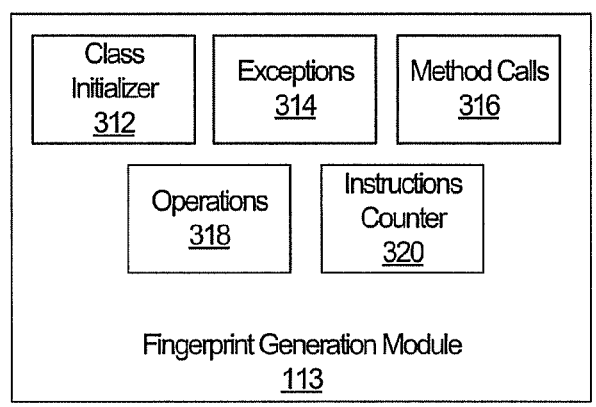
FIG. 3B is a block diagram of a fingerprint generation module, in accordance with an example embodiment of the disclosure.

FIG. 3B is a block diagram of a fingerprint generation module, in accordance with an example embodiment of the disclosure. Referring to FIGS 1-3B, the fingerprint generation module 113 may comprise suitable circuitry, logic and/or code and may be operable to generate a fingerprint of one or more subroutines within the instructions that will be compiled by one or more of the modes of execution 114, . . . , 116. As used herein, a "fingerprint" of a subroutine may be an indicator, which may be used to determine the compilation time and expected performance (e.g., that a piece of code may run twice as quickly) associated with a given mode of execution of the subroutine. A subroutine's fingerprint may be associated with, for example, the number of instructions in the specific subroutine. The fingerprint may be further associated with (and may indicate) one or more of the following: availability of one or more loops in the subroutine; whether the instructions perform a one time "static" class initialization; availability of at least one explicit throw instruction for exceptions; availability of at least one catch block for exceptions; a number of other subroutines from the instructions called by the current subroutine; availability of one or more floating point operations; availability of one or more logical operations; availability of one or more 64-bit integer operations in the current subroutine, and/or other features.

In this regard, the fingerprint generation module 113 may comprise a class initializer module 312, an exceptions module 314, a subroutine calls module 316, an operations module 318, and instructions counter module 310.

The initializer module 312 may comprise suitable circuitry, logic and/or code and may be operable to determine whether the subroutine being fingerprinted is a class initializer (e.g., code that at run-time only runs once) and/or availability of at least one class initializer in the subroutine.

The exceptions module 314 may comprise suitable circuitry, logic and/or code and may be operable to determine, for example, availability of at least one explicit throw statement for exceptions and/or availability of at least one catch block for exceptions in the current subroutine being fingerprinted.

The subroutine calls module 316 may comprise suitable circuitry, logic and/or code and may be operable to determine a number of other subroutines (from the instructions that are being compiled) called by the current subroutine being fingerprinted.

The operations module 318 may comprise suitable circuitry, logic and/or code and may be operable to determine availability of one or more floating point operations in the subroutine being fingerprinted.

The instructions counter module 320 may comprise suitable circuitry, logic and/or code and may be operable to determine availability of one or more bit twiddling operations and/or availability of one or more 64-bit integer operations in the current subroutine being fingerprinted.

Even though only modules 312, 314, 316, 318, and 320 are illustrated within the fingerprint generation module 113, the present disclosure may not be limited in this regard. Other characteristics of the subroutine being fingerprinted may also be considered by the fingerprint generation module. After the fingerprint indicators for each subroutine are generated, the indicators may be stored within the computing device 100 (e.g., using the system memory 104).

Figure 4:
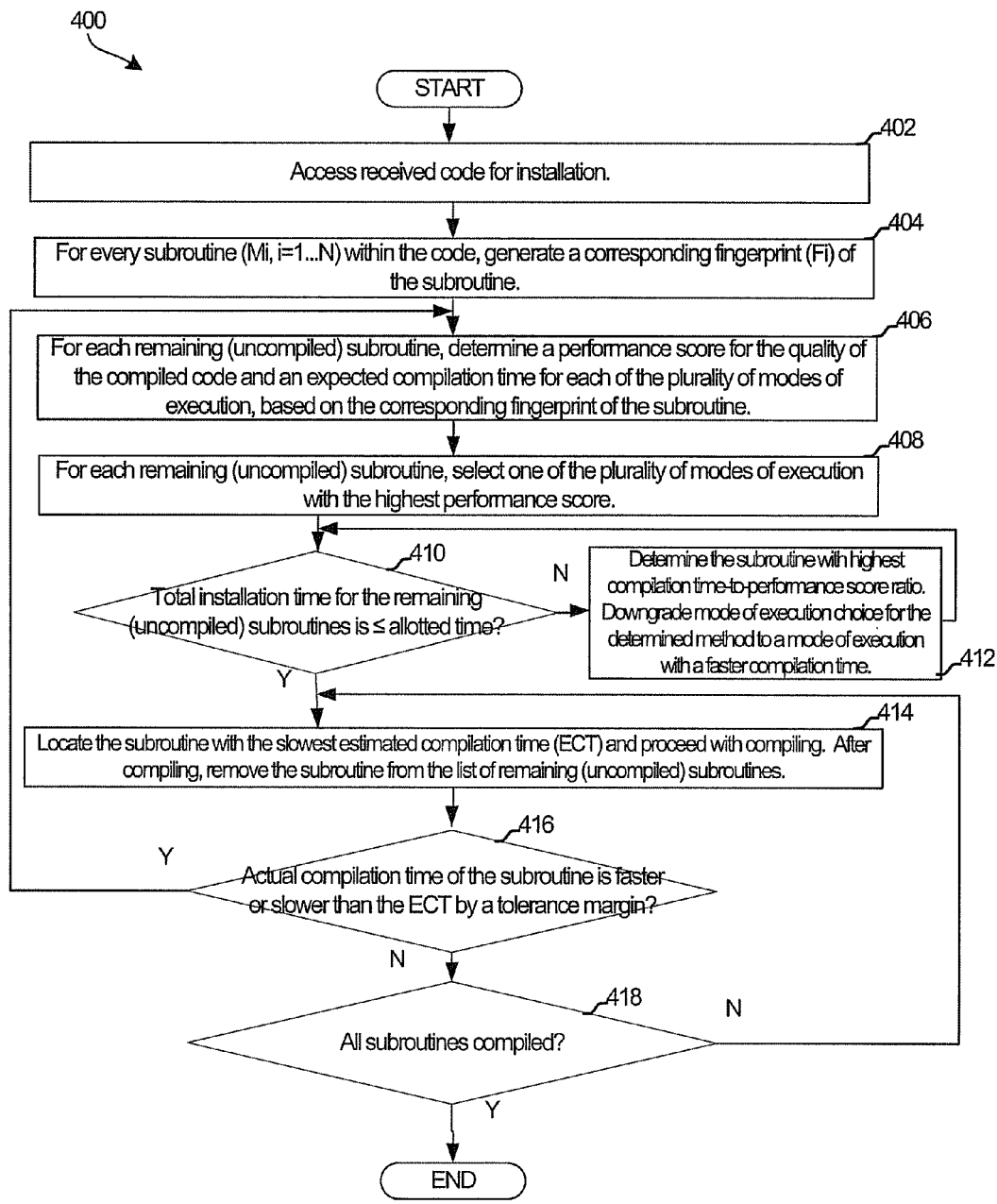
FIG. 4 is a flow chart illustrating example steps of a method for bounded installation time optimization of applications, in accordance with an example embodiment of the disclosure.

FIG. 4 is a flow chart illustrating example steps of a method for bounded installation time optimization of applications, in accordance with an example embodiment of the disclosure. Referring to FIGS. 1-4, the example method 400 may start at 402, when received code (e.g., instructions of one or more received/downloaded apps 115, . . . , 117) may be accessed for compilation by at least one of the plurality of modes of execution 114, . . . , 116. At 404, for every subroutine (Mi, i=1 . . . N) within the code, the fingerprint generation module 113 may generate a corresponding fingerprint (Fi) of the subroutine.

At 406, for each remaining (uncompiled) subroutine, the CPU 102 may determine a performance score for the quality of the compiled code and an expected compilation time for each of the plurality of modes of execution, based on the corresponding fingerprint of the subroutine. At 408, the CPU 102 may select, for each remaining (uncompiled) subroutine, one of the plurality of modes of execution 114, . . . , 116 with the highest performance score.

At 410, the CPU 102 may determine whether the total compilation time for the remaining (uncompiled) subroutines is smaller than or equal to an allotted time interval. If the total compilation time for the remaining (uncompiled) subroutines is greater than the allotted time interval, processing may continue at 412, when the CPU 102 may determine the subroutine with highest compilation time-to-performance score ratio. The CPU 102 may then downgrade the mode of execution choice for the determined subroutine to a mode of execution with a faster compilation time (i.e., a mode of execution with a lower optimization level and faster compilation time). Processing may then resume at step 410.

If the total compilation time for the remaining (uncompiled) subroutines is not greater than the allotted time interval, processing may continue at 414, when the CPU 102 may locate the subroutine (or subroutines) with the slowest estimated compilation time and then proceed with compiling. After the compiling, the CPU 102 may remove the subroutine (or subroutines) from the list of remaining (uncompiled) subroutines.

At 416, it may be determined whether the actual compilation time of the (just compiled) subroutine (or subroutines) is faster or slower than the estimated compilation time by a tolerance margin. If the actual compilation time of the (just compiled) subroutine (or subroutines) is faster or slower than the estimated compilation time by the tolerance margin, processing may continue at step 406. Otherwise, processing may continue at 418. At 418, it may be determined whether all subroutines have been compiled. If there are remaining subroutines to be compiled, processing may resume at 414.

In accordance with an example embodiment of the disclosure, after the first installation of an app (e.g., one of the apps 115, . . . , 117), the compiled app may be re-compiled based on one or more of the methods disclosed herein, to improve future performance of the application. Such re-compilation may take place when the computing device 100 is not in use (e.g., the computing device 100 is in standby mode), or another mode when the device resources are available.

Figure 5:
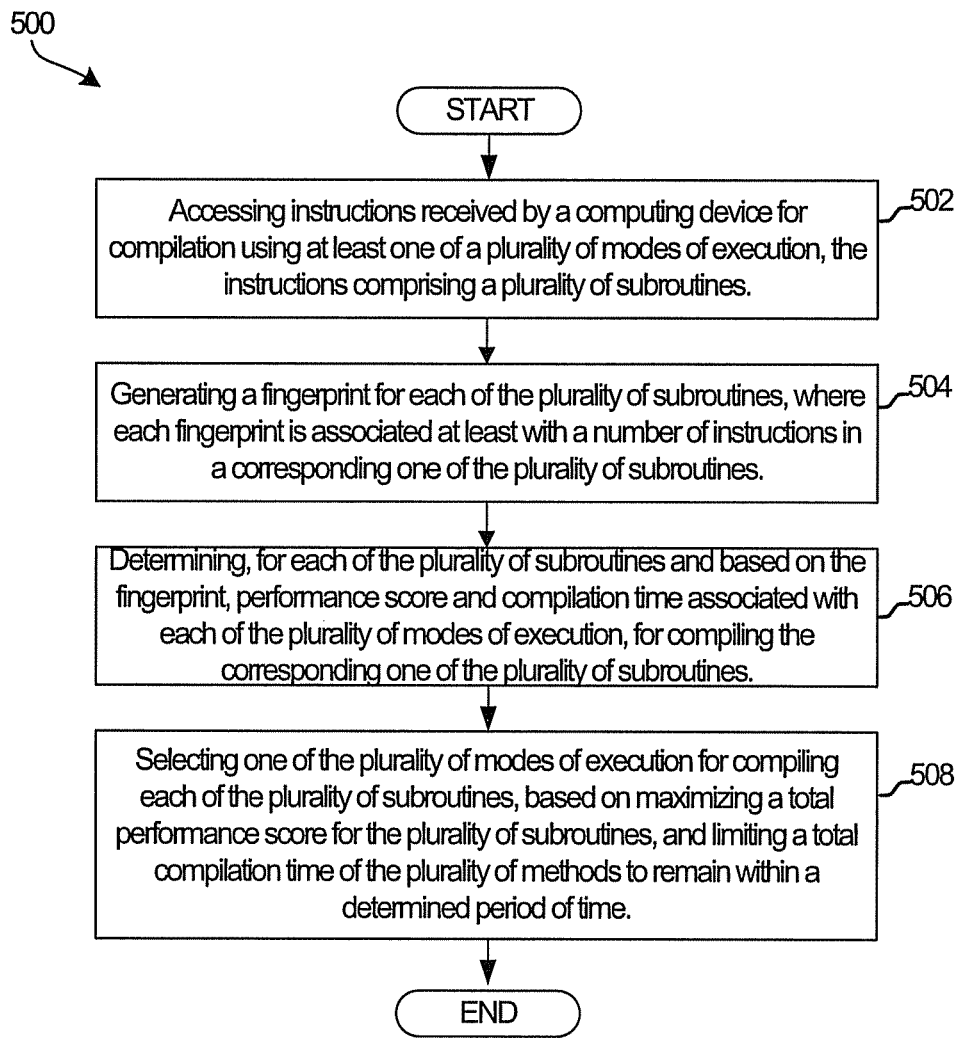
FIG. 5 is a flow chart illustrating example steps of another method for bounded installation time optimization of applications, in accordance with an example embodiment of the disclosure.

FIG. 5 is a flow chart illustrating example steps of another method for bounded installation time optimization of applications, in accordance with an example embodiment of the disclosure. Referring to FIGS. 1-5, the example method 500 may start at 502, when instructions received by the computing device 100 may be accessed for compilation using at least one of a plurality of modes of execution (e.g., 114, . . . , 116). The instructions (e.g., instructions of one of the apps 115, . . . , 117 downloaded from the provisioning server 130) may comprising a plurality of subroutines.

At 504, the fingerprint generation module 113 may generate a fingerprint for each of the plurality of subroutines. Each fingerprint may be associated at least with a number of instructions in a corresponding one of the plurality of subroutines. At 506, the CPU 102 may determine, for each of the plurality of subroutines and based on the fingerprint, performance score and compilation time associated with each of the plurality of modes of execution, for compiling the corresponding one of the plurality of subroutines. At 508, the CPU 102 may select one of the plurality of modes of execution for each of the plurality of subroutines, based on maximizing a total performance score for the plurality of subroutines, and bounding (or limiting) a total compilation time of the plurality of subroutines to remain within a determined period of time.

Figure 6:
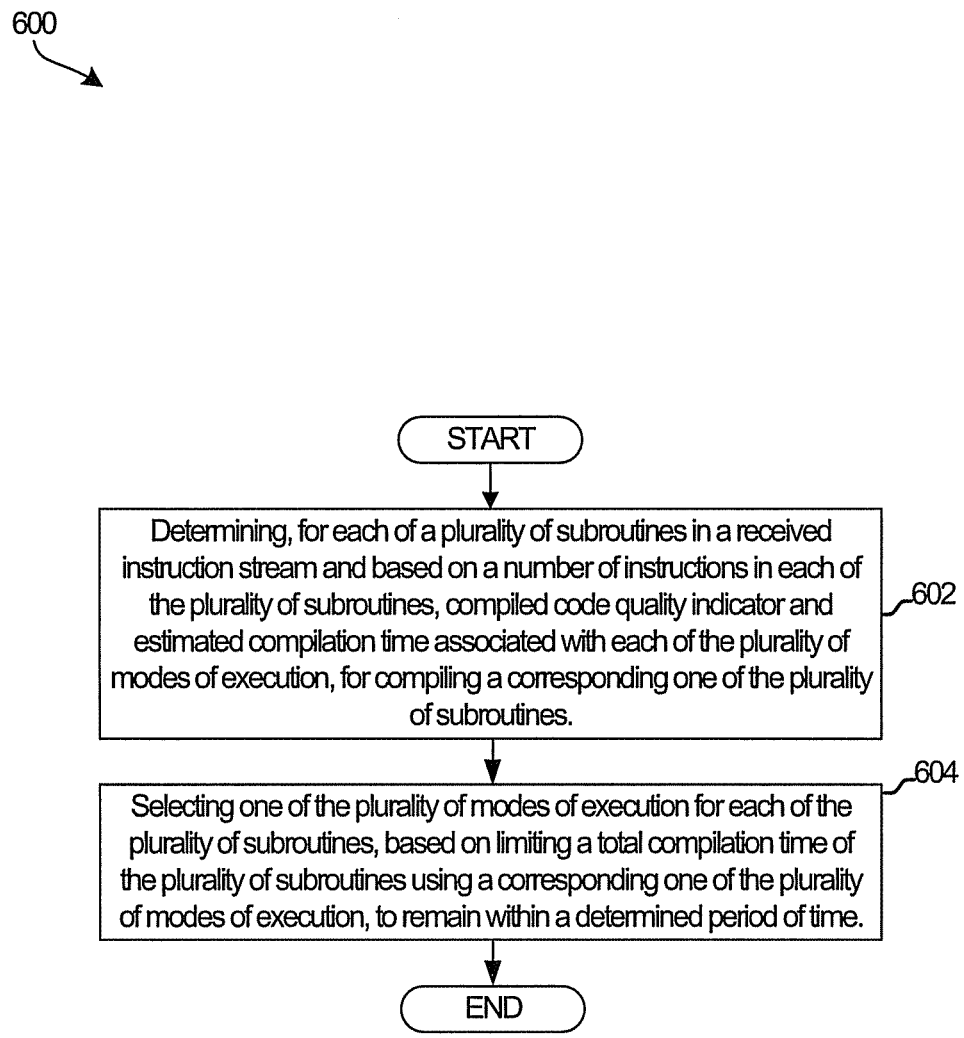
FIG. 6 is a flow chart illustrating example steps of yet another method for bounded installation time optimization of applications, in accordance with an example embodiment of the disclosure.

FIG. 6 is a flow chart illustrating example steps of yet another method for bounded installation time optimization of applications, in accordance with an example embodiment of the disclosure. Referring to FIGS. 1-6, the example method may start at 602, when the CPU 102 may determine, for each of a plurality of subroutines in a received instruction stream (e.g., instructions of one of the apps 115, . . . , 117 downloaded from the provisioning server 130) and based on a number of instructions in each of the plurality of subroutines, compiled code quality indicator and estimated compilation time associated with each of the plurality of modes of execution, for compiling a corresponding one of the plurality of subroutines. At 604, the CPU 102 may select one of the plurality of modes of execution for each of the plurality of subroutines, based on limiting a total compilation time of the plurality of subroutines using a corresponding one of the plurality of modes of execution, to remain within a determined period of time.

Other implementations may provide a machine-readable storage device, having stored thereon, a machine code and/or a computer program having at least one code section executable by a machine and/or a computer, thereby causing the machine and/or computer to perform the steps as described herein.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a hardware processor, memory, and a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and apparatus will include all implementations falling within the scope of the appended claims.

What is claimed is:

1. A method, comprising:
in a computing device comprising at least one processor, a memory, and an operating system with a plurality of modes of execution,
accessing instructions received by the computing device for compilation using at least one of the plurality of modes of execution, wherein the plurality of modes of execution utilize a different level of code optimization during compilation and a quality of compiled code increases using modes of execution with increasing optimization levels, and the instructions comprising a plurality of subroutines;
generating a fingerprint for each of the plurality of subroutines, wherein the fingerprint identifies a plurality of performance scores associated with the plurality of modes of execution of a subroutine on the computing device for corresponding quality of compiled code using the plurality of modes of execution;
determining, for each of the plurality of subroutines and based on the fingerprint, performance score and estimated compilation time associated with each of the plurality of modes of execution, for compiling the corresponding one of the plurality of subroutines, wherein the estimated compilation time depends on hardware characteristics of the computing device as well as a number of the plurality of subroutines in the instructions and the level of code optimization for the mode of execution; and
selecting one of the plurality of modes of execution for compiling each of the plurality of subroutines, based on:
maximizing a total performance score for the plurality of subroutines; and
limiting a total compilation time of the plurality of subroutines to remain within a determined period of time.

2. The method according to claim 1, wherein each fingerprint is further associated with at least one of:
availability of one or more loops in the corresponding one of the plurality of subroutines;
availability of at least one class initializer in the corresponding one of the plurality of subroutines;
availability of at least one explicit throw statement for exceptions in the corresponding one of the plurality of subroutines;
availability of at least one catch block for exceptions in the corresponding one of the plurality of subroutines;
a number of subroutines from the plurality of subroutines called by the corresponding one of the plurality of subroutines;
availability of one or more floating point operations in the corresponding one of the plurality of subroutines;
availability of one or more logical operations in the corresponding one of the plurality of subroutines; and
availability of one or more 64-bit integer operations in the corresponding one of the plurality of subroutines.

3. The method according to claim 1, wherein the plurality of modes of execution comprises an interpreter and at least one compiler.

4. The method according to claim 1, wherein:
each of the plurality of modes of execution is associated with a corresponding optimization level of compilation; and
the performance score for each of the plurality of modes of execution is associated with the corresponding optimization level.

5. The method according to claim 1, comprising:
for each of the plurality of subroutines in the instructions, select one of the plurality of modes of execution associated with a highest performance score, for compiling the corresponding one of the plurality of subroutines.

6. The method according to claim 5, comprising:
determining a total compilation time for the instructions based on the estimated compilation time associated with the one of the plurality of modes of execution selected for each of the plurality of subroutines.

7. The method according to claim 6, comprising:
if the total compilation time is smaller than or equal to an allotted period of time:
compiling one of the plurality of subroutines, wherein a mode of execution selected for the one of the plurality of subroutines is associated with a slowest compilation time.

8. The method according to claim 7, comprising:
comparing actual compilation time used for the compiling with the estimated compilation time associated with the mode of execution selected for compiling the one of the plurality of subroutines; and
if the actual compilation time and the estimated compilation time associated with the mode of execution selected for compiling the one of the plurality of subroutines differ by an allotted margin of tolerance, re-computing the total compilation time for the plurality of subroutines, excluding the compile time of the subroutines compiled from the plurality of subroutines.

9. The method according to claim 6, comprising:
if the total compilation time is greater than the allotted period of time:
downgrading a mode of execution selection for the one of the plurality of subroutines associated with the slowest compilation time, by selecting another one of the plurality of modes of execution with a performance score that is lower than a performance score of a previously selected mode of execution; and
compiling the one of the plurality of subroutines using the selected another one of the plurality of modes of execution.

10. The method according to claim 6, comprising:
if the total compilation time is greater than the allotted period of time:
selecting one of the plurality of subroutines associated with a highest estimated compilation time-to-performance score ratio;
downgrading a mode of execution selection for the selected one of the plurality of subroutines associated with the highest estimated compilation time-to-performance score ratio, by selecting another one of the plurality of modes of execution with a performance score that is lower than a performance score of a previously selected compiler for the selected one of the plurality of subroutines; and
compiling the selected one of the plurality of subroutines using the selected another one of the plurality of compilers.

11. A machine-readable storage device, having stored thereon a computer program having at least one code section, the at least one code section being executable by a machine including at least one processor, a memory, and an operating system with a plurality of modes of execution, for causing the machine to perform a method comprising:
accessing instructions received by the computing device for compilation using at least one of the plurality of modes of execution, wherein the plurality of modes of execution utilize a different level of code optimization during compilation and a quality of compiled code increases using modes of execution with increasing optimization levels, and the instructions comprising a plurality of subroutines;
generating a fingerprint for each of the plurality of subroutines, wherein the fingerprint identifies a plurality of performance scores associated with the plurality of modes of execution of a subroutine for corresponding quality of compiled code using the plurality of modes of execution;
determining, for each of the plurality of subroutines and based on the fingerprint, performance score and estimated compilation time associated with each of the plurality of modes of execution, for compiling the corresponding one of the plurality of subroutines, wherein the estimated compilation time depends on hardware characteristics of the machine as well as a number of the plurality of subroutines in the instructions and the level of code optimization for the mode of execution; and
selecting one of the plurality of modes of execution for compiling each of the plurality of subroutines, based on:
maximizing a total performance score for the plurality of subroutines; and
limiting a total compilation/installation time of the plurality of subroutines to remain within a determined period of time.

12. The machine-readable storage device according to claim 11, wherein each fingerprint is further associated with at least one of:
availability of one or more loops in the corresponding one of the plurality of subroutines;
availability of at least one class initializer in the corresponding one of the plurality of subroutines;
availability of at least one explicit throw statement for exceptions in the corresponding one of the plurality of subroutines;
availability of at least one catch block for exceptions in the corresponding one of the plurality of subroutines;
a number of subroutines from the plurality of subroutines called by the corresponding one of the plurality of subroutines;
availability of one or more floating point operations in the corresponding one of the plurality of subroutines;
availability of one or more logical operations in the corresponding one of the plurality of subroutines; and
availability of one or more 64-bit integer operations in the corresponding one of the plurality of subroutines.

13. The machine-readable storage device according to claim 11, wherein:
each of the plurality of modes of execution is associated with a corresponding optimization level of compilation; and
the performance score for each of the plurality of modes of execution is associated with the corresponding optimization level.

14. The machine-readable storage device according to claim 11, wherein the at least one code section comprises code causing the machine, for each of the plurality of subroutines in the instructions, to:
select one of the plurality of modes of execution associated with a highest performance score, for compiling the corresponding one of the plurality of subroutines.

15. The machine-readable storage device according to claim 14, wherein the at least one code section comprises code causing the machine to:

determine a total compilation time for the instructions based on the estimated compilation time associated with the one of the plurality of modes of execution selected for each of the plurality of subroutines.

16. The machine-readable storage device according to claim 15, wherein the at least one code section comprises code causing the machine, if the total compilation time is smaller than or equal to an allotted period of time, to:
   compile one of the plurality of subroutines, wherein a mode of execution selected for the one of the plurality of subroutines is associated with a slowest compilation time.

17. The machine-readable storage device according to claim 16, wherein the at least one code section comprises code causing the machine to:
   compare actual compilation time used for the compiling with the estimated compilation time associated with the compiler selected for compiling the one of the plurality of subroutines; and
   if the actual compilation time and the estimated compilation time associated with the compiler selected for compiling the one of the plurality of subroutines differ by an allotted margin of tolerance, re-compute the total compilation time for the plurality of subroutines, excluding the compile time of the subroutines compiled from the plurality of subroutines.

18. The machine-readable storage device according to claim 15, wherein the at least one code section comprises code causing the machine, if the total compilation time is greater than the allotted period of time, to:
   downgrade a mode of execution selection for the one of the plurality of subroutines associated with the slowest compilation time, by selecting another one of the plurality of modes of execution with a performance score that is lower than a performance score of a previously selected compiler; and
   compile the one of the plurality of subroutines using the selected another one of the plurality of modes of execution.

19. The machine-readable storage device according to claim 15, wherein the at least one code section comprises code causing the machine, if the total compilation time is greater than the allotted period of time, to:
   select one of the plurality of subroutines associated with a highest estimated compilation time-to-performance score ratio;
   downgrade a mode of execution selection for the selected one of the plurality of subroutines associated with the highest estimated compilation time-to-performance score ratio, by selecting another one of the plurality of modes of execution with a performance score that is lower than a performance score of a previously selected mode of execution for the selected one of the plurality of subroutines; and
   compile the selected one of the plurality of subroutines using the selected another one of the plurality of modes of execution.

20. A method, comprising:
   in a computing device comprising at least one processor, a memory, and an operating system with a plurality of modes of execution,
   determining, for each of a plurality of subroutines in a received instruction stream and based on a number of instructions in each of the plurality of subroutines, compiled code quality indicator and estimated compilation time associated with each of the plurality of modes of execution, for compiling a corresponding one of the plurality of subroutines, wherein the plurality of modes of execution utilize a different level of code optimization during compilation and a quality of compiled code increases using modes of execution with increasing optimization levels, and wherein the estimated compilation time depends on hardware characteristics of the computing device as well as the number instructions in the plurality of subroutines and the level of code optimization for the mode of execution; and
   selecting one of the plurality of modes of execution for each of the plurality of subroutines, based on limiting a total compilation time of the plurality of subroutines using a corresponding one of the plurality of modes of execution, to remain within a determined period of time, and based on maximizing the compiled code quality indicator for the plurality of subroutines.

* * * * *